R. Eickemeyer.
Pouncing Hats.
Nº 97,178. Patented Nov. 23, 1869.
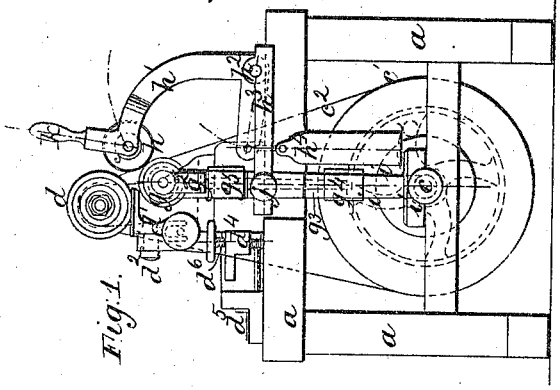
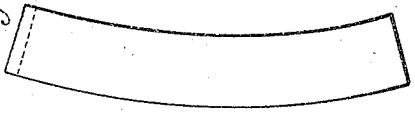
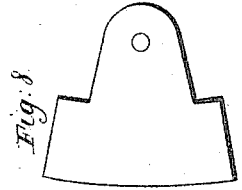
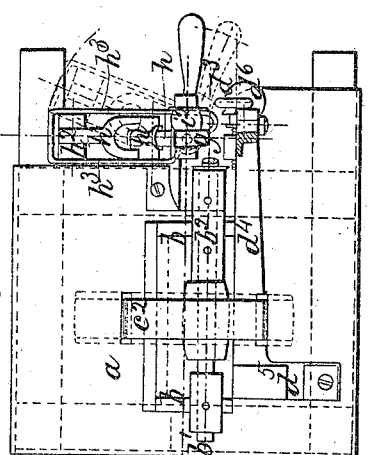
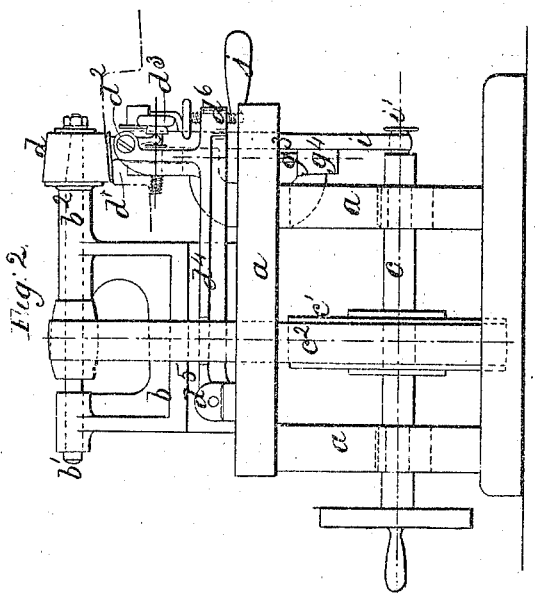
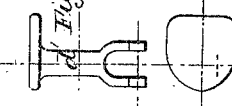
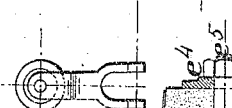
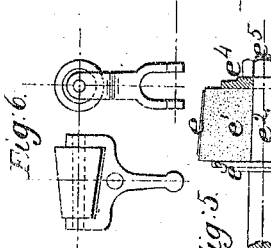
Witnesses:
F. C. Hendrick Jr.
Joseph Campbell
Inventor:
R. Eickemeyer

UNITED STATES PATENT OFFICE.

RUDOLF EICKEMEYER, OF YONKERS, NEW YORK.

IMPROVEMENT IN MACHINES FOR POUNCING HATS.

Specification forming part of Letters Patent No. 97,178, dated November 23, 1869.

*To all whom it may concern:*

Be it known that I, RUDOLF EICKEMEYER, of Yonkers, in the county of Westchester and State of New York, have invented certain new and useful Improvements in Hat-Pouncing Machines; and I do hereby declare that the following is a full and correct description thereof, reference being had to the accompanying drawings, and to the letters of reference thereon.

The first part of my invention relates to the rotating emery-wheel or "pouncing-cylinder;" and consists in an elastic pouncing-cylinder or emery-wheel formed of a sleeve or bag of emery-paper or emery-cloth placed upon a wheel, cylinder, cone, or other proper-shaped holder of elastic rubber or equivalent material, and held thereon by the distention of the rubber holder circumferentially within the sleeve of emery or glass-covered paper or cloth. The distention may be effected by forcing the rubber holder upon a taper-lathe mandrel, or by compression between clamping-plates at the ends of the pouncing-cylinder, connected and drawn together by a tubular screw through the axis of the rubber holder, the tubular screw being provided with an internal screw to attach it to the lathe-mandrel; but I prefer to place the rubber holder upon a lathe-mandrel of either taper or cylindrical form, provided with a flange and a follower, the latter to be screwed up against the outer end of the rubber holder, as shown in the drawings, and hereinafter more particularly described.

My improved emery-wheel or pouncing-cylinder has the advantages of a flexible surface, and great facility in changing the emery or powdered-glass cutting-surface, which, in the operation of pouncing hats, soon becomes gummed with the size or gum used in stiffening the hat-bodies. The flexibility of the surface adapts it to other purposes than pouncing hats, being applicable to grinding rounded metal surfaces.

My invention further consists in an arrangement of the pouncing-cylinder and a rest or supporting-horn for the hat-body, which can be introduced within the crown to support it against the cutting action of the pouncing-cylinder during the operation of pouncing, the arrangement being such as to dispense with the use of a hat-block in pouncing the tips and side crowns of the hats.

My invention further consists in the mode of adjusting the rest or supporting-horn, and also a swiveling feeding apparatus, whereby the feed-motion imparted to the hat may be changed at pleasure during the operation of pouncing to a larger or smaller curve, or a straight line, as required by the different parts of the hat-body undergoing the operation of pouncing.

But, more particularly to describe my invention, I will refer to the accompanying drawings, which represent a machine for pouncing hats which embodies my aforesaid improvements.

Figure 1 represents a front elevation of the machine; Fig. 2, a side elevation; Fig. 3, a plan view of the same; Fig. 4, detached views of the side elevation and plan of the adjustable part of the supporting-horn; Fig. 5, section of the improved emery-wheel or pouncing-cylinder; Fig. 6, detached views, side elevation, and plan of a roller substitute for the adjustable supporting-horn shown in Fig. 4; Figs. 7 and 8, plan views of sheet-metal patterns used in cutting out and folding the sleeves of emery-paper for the pouncing-cylinder.

Letter $a$ represents a table or bench, on which is placed a lathe-head, $b$, facing the front of the bench.

Motion is imparted to the lathe-mandrel $b^1$ from a shaft, $c$, below the table by a pulley, $c^1$, and belt $c^2$.

A tubular portion, $b^2$, of the lathe-head projects forward to the front of the table to support the mandrel near the pouncing-cylinder $d$, and give room for the rim of the hat when the tip is pouncing. This tubular portion of the lathe-head is not a necessary feature of the construction, but is preferable, because the use of it admits of using a shorter lathe-head and lighter mandrel than if the mandrel were unsupported beyond the lathe-head, from which it must project sufficiently to make room for the hat, as shown in Fig. 2 of the drawings.

Directly under the pouncing-cylinder is a vertical supporting-horn or rest, $d^1$, the upper part of which is hinged to the lower part at $d^2$, and adjusted to the inclination of the pouncing-cylinder by the adjusting-screw $d^3$.

For the purpose of readily adjusting the supporting-horn to different sizes of pouncing-cylinders or varying thicknesses of hat-bodies, it is mounted upon or cast with a horizontal treadle-lever, $d^4$, pivoted at $d^5$, and adjusted by the adjusting-screw $d^6$; but any other practical mode of mounting the vertical supporting-horn will answer which will admit of vertical adjustment and leave sufficient space between it and the lathe-head for the brim of the hat when pouncing the tip, the essential part of the arrangement of the supporting-horn being the space left between it and the lathe-head to give room for the brim while it is supporting the tip in the operation of pouncing.

Instead of the flat supporting-surface of the supporting-horn, as in the principal figures of the drawings, and in detail in Fig. 4, a roller-supporting surface—such as shown in Fig. 6—may be used, being hinged and adjusted in the same manner.

The pouncing-cylinder (shown in section at Fig. 5) is composed of a sleeve of emery paper or cloth, $e$, placed upon a conical rubber holder, $e^1$, mounted upon a taper-lathe mandrel, $e^2$, between a flange or clamping-plate, $e^3$, upon the lathe-mandrel, and a follower, $e^4$, set up by a screw-nut, $e^5$, upon the end of the lathe-mandrel. By unscrewing the nut the sleeve of emery or glass-covered cloth is loosened, and may be removed and replaced by another.

The sleeves should be made of cloth or paper, covered with powdered glass, emery, or other suitable cutting-surface, glued to the paper or cloth; and, for convenience in making them, a sheet-metal segmental pattern, of the proper shape for the cone, and similar to Fig. 7, should be used in cutting out the emery paper or cloth, and another sheet-metal pattern, like Fig. 8, should be used in forming the sleeve and gluing the ends together. A proper supply of the conical or cylindrical sleeves being thus made and at hand, the operation of the machine is but momentarily interfered with when necessary to renew the pouncing-surface.

The lower feeding-wheel, $g$, Fig. 1, is mounted in the forked end $g^2$ of a vertical spindle or rocking shaft, $g^3$, supported by a step, $g^4$, and bearing $g^5$. The upper feeding-wheel, $h$, is supported by a bent lever, $h^1$, pivoted at $h^2$ to a horizontal frame, $h^3$, attached to the vertical spindle $g^3$, which carries the lower roller, so that both feed-rollers are supported by and swivel on the same vertical axis.

The feeding motion is given to the feed-wheels by a band, $i$, running from a pulley, $i^1$, upon the shaft $c$ beneath the table, over a pulley, $i^2$, Fig. 3, attached to the side of the lower feeding-wheel, the upper feed-wheel being held against the lower by a weight, $h^4$, suspended from an arm of the bent lever $h^1$.

The bent lever $h^1$, which holds the upper feed-wheel, should be bent out sufficiently to give room for the brim of the hat when the tip is pouncing.

The feed wheels or rollers feed the hat-body either in a curved or straight line, as they are held in position by the operator, who takes hold of the handle $j$ for that purpose, the handle $k$ being used to lift the upper feed-wheel from the upper surface of the hat.

Now, it is obvious that the feeding-wheels being in advance of the pouncing-cylinder and supporting-horn, by changing the position of their axis from a position parallel with the axis of the pouncing-cylinder to a greater or less angle within certain limits the brim and tip of the hat-body may be fed under the pouncing-cylinder in required horizontal curves or circles, and the side crown directly forward, the direction of the feed being wholly under the control of the operator.

I claim—

1. A pouncing-cylinder or emery-wheel consisting of an elastic rubber body or holder, provided with means of circumferential distention, and a sleeve or cover of emery-paper or emery-cloth, or its equivalent, substantially as described.

2. The arrangement and combination of a rotating pouncing-cylinder with a vertical supporting-horn, substantially as described, whereby the supporting-horn may be used to support the tip, side crown, or brim during the operation of pouncing the hat.

3. In combination with a rotating pouncing-cylinder and a rest or supporting-horn, a swiveling feeding mechanism, substantially as described, whereby the hat may be drawn between the pouncing-cylinder in different curves or directly forward, as required.

4. In combination with the rotating pouncing-cylinder and supporting-horn, the hinge and set-screw, whereby the supporting-horn is adjusted to the inclination of the sides of the pouncing-cylinder.

5. In combination with the pouncing-cylinder and the supporting-horn for the hat, the horizontal treadle-lever and adjusting-screw, whereby the supporting-horn is adjusted vertically to various sizes of pouncing-cylinders or various thicknesses of hat-bodies.

R. EICKEMEYER.

Witnesses:
F. C. TREADWELL, Jr.,
JOSEPH CAMPBELL.